United States Patent
Ballakur et al.

(10) Patent No.: US 11,134,471 B2
(45) Date of Patent: Sep. 28, 2021

(54) APPARATUSES AND METHODS FOR COORDINATING OPERATIONS OF RECEIVING CELL BROADCAST MESSAGES USING DIFFERENT SUBSCRIBER NUMBERS AND SHARING SCHEDULE INFORMATION THEREBETWEEN

(71) Applicant: MediaTek Singapore Pte. Ltd., Singapore (SG)

(72) Inventors: Ravitej Ballakur, Bengaluru (IN); Umesh Bysani, Bengaluru (IN)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 18 days.

(21) Appl. No.: 16/702,044

(22) Filed: Dec. 3, 2019

(65) Prior Publication Data
US 2021/0076355 A1    Mar. 11, 2021

(30) Foreign Application Priority Data

Sep. 10, 2019  (IN) .............................. 201921036276

(51) Int. Cl.
*H04W 72/00*    (2009.01)
*H04W 72/12*    (2009.01)
*H04W 76/28*    (2018.01)
*H04W 8/18*    (2009.01)
*H04W 8/26*    (2009.01)
*H04W 8/20*    (2009.01)

(52) U.S. Cl.
CPC ......... *H04W 72/005* (2013.01); *H04W 8/183* (2013.01); *H04W 8/205* (2013.01); *H04W 8/26* (2013.01); *H04W 72/1273* (2013.01); *H04W 76/28* (2018.02)

(58) Field of Classification Search
None
See application file for complete search history.

(56) References Cited

U.S. PATENT DOCUMENTS

| | | | | |
|---|---|---|---|---|
| 2009/0239584 A1* | 9/2009 | Jheng | ...................... | H04W 8/26 455/558 |
| 2013/0017862 A1* | 1/2013 | Lee | ................... | H04M 3/42238 455/558 |
| 2017/0086046 A1* | 3/2017 | Ponukumati | ........ | H04L 12/1895 |

FOREIGN PATENT DOCUMENTS

WO    2017/062860 A1    4/2017

OTHER PUBLICATIONS

Indian office action dated Jul. 12, 2021, issued in application No. IN 201921036276.

* cited by examiner

*Primary Examiner* — Kouroush Mohebbi
(74) *Attorney, Agent, or Firm* — McClure, Qualey & Rodack, LLP

(57) ABSTRACT

A mobile communication device including a single Radio Frequency (RF) device is provided for coordinating operations of receiving cell broadcast messages using different subscriber numbers camped on the same cell. The mobile communication device is characterized in that one subscriber number is prioritized at a time for receiving all the blocks of a CBS message or a schedule message, allowing at least one subscriber number to receive a complete CBS message or a complete schedule message. In addition, the mobile communication device is characterized in that the schedule information received for one subscriber number is shared between the operations associated with other subscriber numbers, allowing the CBS messages for all subscriber numbers to be received.

16 Claims, 10 Drawing Sheets

APPARATUSES AND METHODS FOR COORDINATING OPERATIONS OF RECEIVING CELL BROADCAST MESSAGES USING DIFFERENT SUBSCRIBER NUMBERS AND SHARING SCHEDULE INFORMATION THEREBETWEEN

CROSS REFERENCE TO RELATED APPLICATIONS

This Application claims priority of India Application No. 201921036276, filed on Sep. 10, 2019, the entirety of which is incorporated by reference herein.

BACKGROUND OF THE APPLICATION

Field of the Application

The application generally relates to cell broadcast message processing, and more particularly, to apparatuses and methods for coordinating the operations of receiving cell broadcast messages using different subscriber numbers and sharing schedule information therebetween.

Description of the Related Art

With growing demand for ubiquitous computing and networking, various Radio Access Technologies (RATs) have been developed, such as the Global System for Mobile communications (GSM) technology, General Packet Radio Service (GPRS) technology, Enhanced Data rates for Global Evolution (EDGE) technology, Universal Mobile Telecommunications System (UMTS) technology, Interim Standard 95 (IS-95) technology, Code Division Multiple Access 2000 (CDMA 2000) technology, CDMA 2000 1x Evolution-Data Optimized or Evolution-Data (CDMA2000 1x EV-DO) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, LTE-Advanced (LTE-A) technology, and others.

Conventionally, a cellular phone only supports one RAT with one subscriber number for providing users with the flexibility of mobile communications at all times via the supported RAT using the single subscriber number. However, to an increasing extent, more and more people find having an additional subscriber number to be a good way to reduce their mobile service charges (including voice and/or data services), or to separate personal and business phone calls. In order to alleviate the burden of carrying two cellular phones for two separate subscriber numbers, so-called dual-card cellular phones have been developed, which generally support at least two RATs for respective mobile services using an individual subscriber identity card to provide an individual subscriber number. The dual-card design allows both RATs to be active simultaneously and allows calls to be made or received on either subscriber number at any time.

Generally, for cost reduction, most dual-card cellular phones are equipped with a single Radio Frequency (RF) device. Due to the fact that the single RF device is shared by the transmission/reception operations associated with two separate subscriber numbers, only one subscriber number is allowed to occupy the single RF device for transmission/reception operations at any given time. In cases where a Cell Broadcast Service (CBS) message or a schedule message is configured to be transmitted to a dual-card cellular phone in two or more time slots, the reception operations associated with two separate subscriber numbers may collide and the single RF device is commonly allocated to either one of the subscriber numbers using a round-robin scheduling policy. CBS messages are commonly used for public warning systems, such as Commercial Mobile Alert Service (CMAS) or Earthquake and Tsunami Warning System (ETWS), to distribute warning information on behalf of public authority, and a CBS message may be broken down into multiple segments/blocks to be transmitted in multiple time slots.

FIG. 1 is a schematic diagram illustrating the reception operations associated with two separate subscriber numbers using a round-robin scheduling policy. As shown in FIG. 1, the communications with the same cell using two separate subscriber numbers (it is assumed that both subscriber numbers belong to the same subscription) are configured to be in the Discontinuous Reception (DRX) level 1 scheduling mode, and the occasions configured for each subscriber number to receive the blocks of a respective CBS or schedule message are denoted in grey background, wherein collisions of the reception operations occur in occasions 0, 6, and 12. According to the round-robin scheduling policy, subscriber number #1 would not be able to receive the block transmitted in occasion 6, while subscriber number #2 would not be able to receive the blocks transmitted in occasions 0 and 12. As a result, neither of the two separate SIMs can receive a complete CBS message or a schedule message.

BRIEF SUMMARY OF THE APPLICATION

In order to solve the aforementioned problem, the present application proposes to prioritize one subscriber number at a time for receiving all the blocks of a CBS message or a schedule message, allowing at least one subscriber number to receive a complete CBS message or a complete schedule message. In addition, the present application proposes to share the schedule information between the operations associated with the multiple subscriber numbers for receiving their respective CBS messages when these subscriber numbers all camp on the same cell.

In a first aspect of the application, a mobile communication device comprising single Radio Frequency (RF) device and baseband processor is provided. The single RF device is configured to perform wireless transmission and reception to and from a first cellular station and a second cellular station. The baseband processor is configured to use a first subscriber number to receive one of multiple blocks of a first Cell Broadcast Service (CBS) message or a first schedule message from the first cellular station via the single RF device, prioritize using the first subscriber number for receiving the rest of the multiple blocks from the first cellular station over using a second subscriber number for receiving any block of a second CBS message or a second schedule message from the second cellular station via the single RF device, and in response to receiving all of the multiple blocks, reassemble the multiple blocks to obtain the first CBS message or the first schedule message.

In a second aspect of the application, a method for coordinating operations of receiving cell broadcast messages using different subscriber numbers in a mobile communication device comprising a single RF device is provided. The method comprises the steps of: using a first subscriber number to receive one of multiple blocks of a first CBS message or a first schedule message from a first cellular station via the single RF device; prioritizing using the first subscriber number for receiving the rest of the multiple blocks from the first cellular station over using a second subscriber number for receiving any block of a second CBS message or a second schedule message from a second cellular station via the single RF device; and in response to receiving all of the multiple blocks, reassembling the multiple blocks to obtain the first CBS message or the first schedule message.

In a third aspect of the application, a mobile communication device comprising single RF device and baseband processor is provided. The single RF device is configured to perform wireless transmission and reception to and from a cellular station. The baseband processor is configured to use a first subscriber number to receive all blocks of a schedule message from the cellular station via the single RF device, perform a first reception operation using the first subscriber number for receiving one or more first CBS messages from the cellular station via the single RF device according to the schedule message, and share the schedule message with a second reception operation using a second subscriber number for receiving one or more second CBS messages from the cellular station via the single RF device.

In a fourth aspect of the application, a method for sharing schedule information between operations of receiving CBS messages using different subscriber numbers in a mobile communication device comprising a single RF device is provided. The method comprises the steps of: using a first subscriber number to receive a schedule message from a cellular station via the single RF device; performing a first reception operation using the first subscriber number for receiving one or more first CBS messages from the cellular station via the single RF device according to the schedule message; and sharing the schedule message with a second reception operation using a second subscriber number for receiving one or more second CBS messages from the cellular station via the single RF device.

Other aspects and features of the present application will become apparent to those with ordinarily skill in the art upon review of the following descriptions of specific embodiments of the mobile communication devices, the methods for coordinating operations of receiving cell broadcast messages using different subscriber numbers, and the methods for sharing schedule information between operations of receiving CBS messages using different subscriber numbers.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
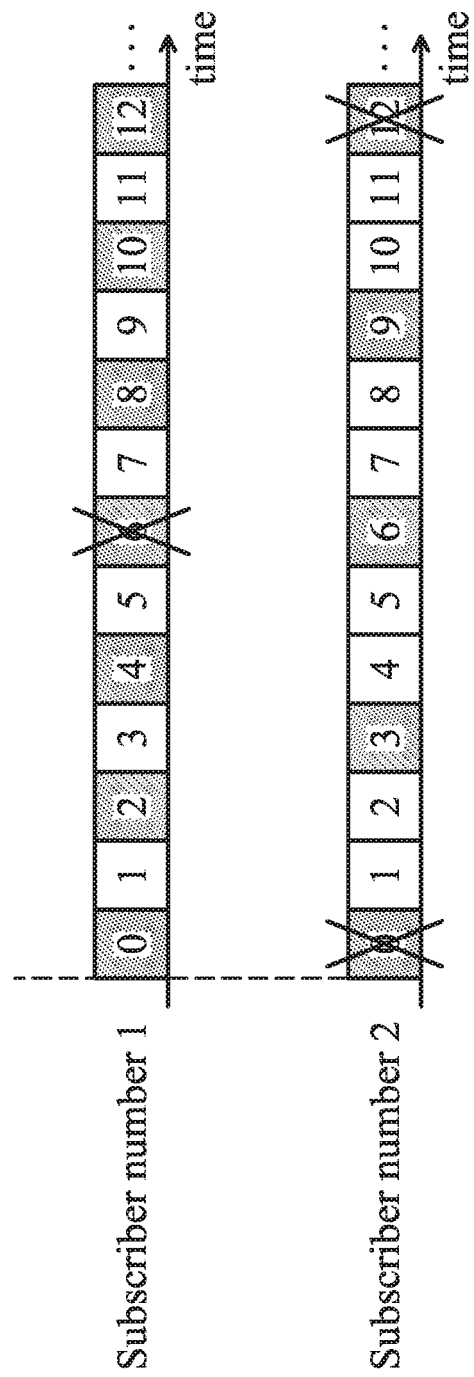
FIG. 1 is a schematic diagram illustrating the reception operations associated with two separate subscriber numbers using a round-robin scheduling policy.
Figure 2:
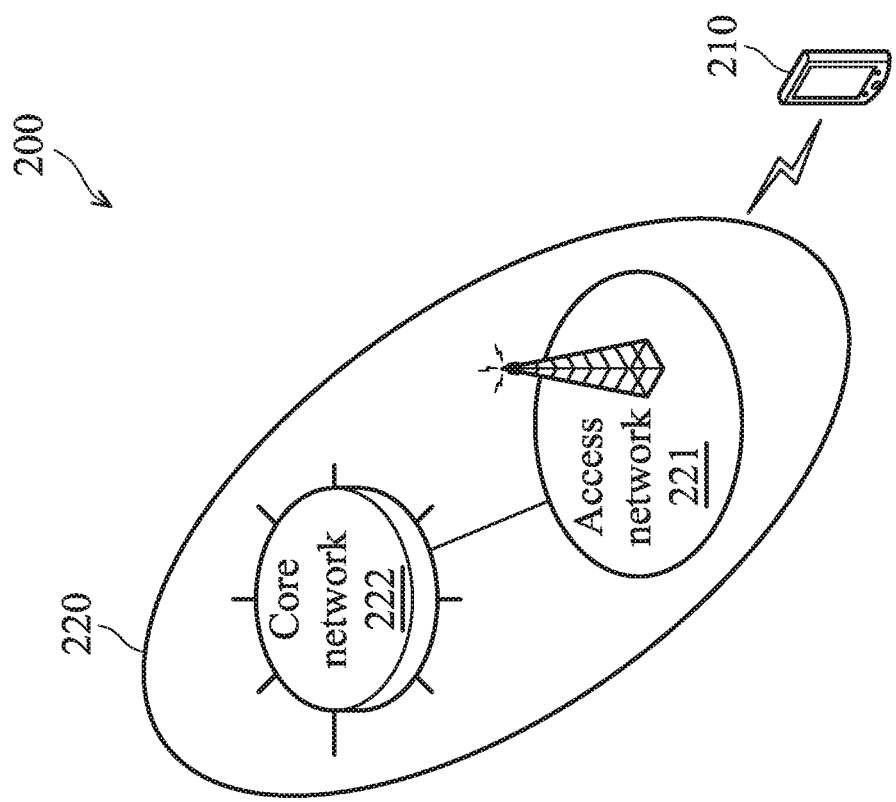
FIG. 2 is a block diagram illustrating a wireless communications environment according to an embodiment of the application.

FIG. 2 is a block diagram illustrating a wireless communications environment according to an embodiment of the application.

As shown in FIG. 2, the wireless communications environment 200 includes a mobile communication device 210 and a service network 220. The mobile communication device 210 may wirelessly communicate with the service network 220 using multiple separate subscriber numbers, after camping on one cell. Each cell may be managed by a cellular station, such as a Node-B (NB), a Base Transceiver Station (BTS), a Base Station (BS), an Advanced BS (ABS), an enhanced BS (eBS), or others.

For example, the mobile communication device 210 may camp on one cell which is managed by a cellular station of the service network 220, for using multiple separate subscriber numbers to obtain wireless services via the cell.

The mobile communication device 210 may be referred to as User Equipment (UE) or Mobile Station (MS), such as a feature phone, a smartphone, a panel Personal Computer (PC), a laptop computer, or any computing device supporting the RAT utilized by the service network 220. In particular, the mobile communication device 210 includes a single RF device and is able to provide the so-called Dual SIM Dual Standby (DSDS) or Triple SIM Triple Standby (TSTS) functionality.

The service network 220 may be a GSM/GPRS/EDGE, UMTS, IS-95, CDMA 2000, CDMA2000 1x EV-DO, TD-SCDMA, or WiMAX network, or others. Specifically, the service network 220 includes an access network 221 and a core network 222. The access network 221 is responsible for processing radio signals, terminating radio protocols, and connecting the mobile communication device 210 with the core network 222, while the core network 222 is responsible for performing mobility management, network-side authentication, and interfaces with public/external networks (e.g., the Internet).

The access network 221 and the core network 222 may each include one or more network nodes for carrying out said functions.

For example, if the service network 220 is a GSM/GPRS/EDGE network, the access network 221 may be a GSM EDGE Radio Access Network (GERAN) which includes at least a BTS and a Base Station Controller (BSC), and the core network 222 may be a GPRS core which includes at least a Mobile Switching Center (MSC), Home Location Register (HLR), Serving GPRS Support Node (SGSN), and Gateway GPRS Support Node (GGSN).

If the service network 220 is a UMTS network, the access network 221 may be a Universal Terrestrial Radio Access Network (UTRAN) which includes at least one BS and at least one Radio Network Controller (RNC), and the core network 222 may be a GPRS core which includes at least an MSC, HLR, SGSN, and GGSN.

The subscriber numbers used by the mobile communication device 210 may be provided by two or more separate single-mode subscriber identity cards in compliance with the specifications of the RAT utilized by the service network 220. For example, if the service network 220 is a GSM/GPRS/EDGE network, each of the single-mode subscriber identity cards may be a Subscriber Identity Module (SIM) card. If the service network 220 is a UMTS network, each of the single-mode subscriber identity cards may be a Universal SIM (USIM) card. If the service network 220 is an IS-95, CDMA 2000, or CDMA2000 1x EV-DO network, each of the single-mode subscriber identity cards may be a Removable User Identity Module (R-UIM) card. If the service network 220 is a TD-SCDMA network, each of the single-mode subscriber identity cards may be a CDMA Subscriber Identity Module (CSIM) card.

Alternatively, the subscriber numbers may be provided by at least a dual-mode subscriber identity card in compliance with the specifications of the RAT utilized by the service network 220. For example, the service network 220 may be a GSM/GPRS/EDGE network, and the dual-mode subscriber identity card may be a SIM card holding two sets of subscriber information, including the subscriber numbers. Likewise, the service network 220 may be a UMTS network, and the dual-mode subscriber identity card may be a USIM card holding two sets of subscriber information, including the subscriber numbers.

Figure 3:
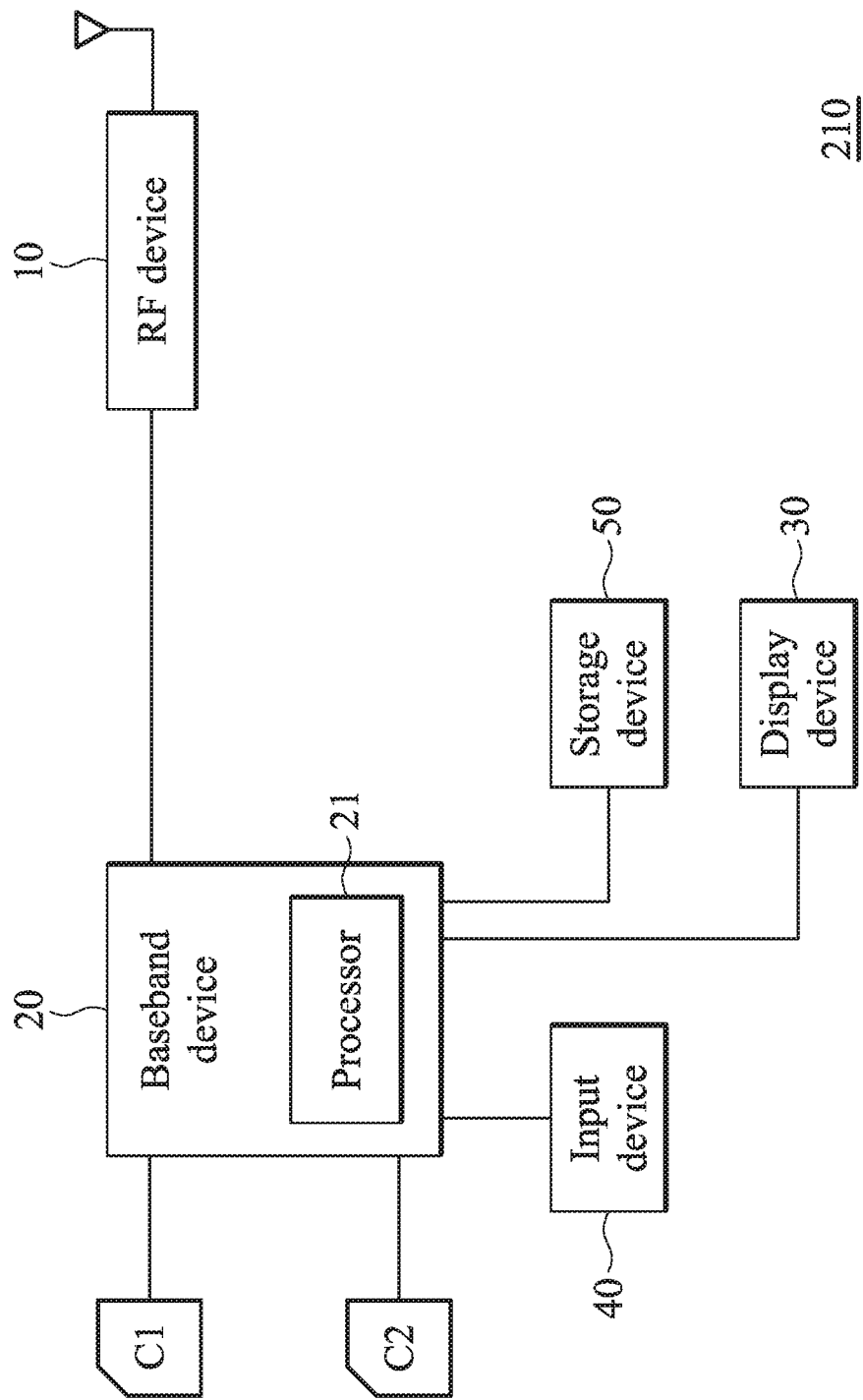
FIG. 3 is a block diagram illustrating the mobile communication device 210 according to an embodiment of the application.

FIG. 3 is a block diagram illustrating the mobile communication device 210 according to an embodiment of the application.

As shown in FIG. 3, the mobile communication device 210 includes a Radio Frequency (RF) device 10, a baseband device 20, a display device 30, an input device 40, and a storage device 50, wherein the RF device 10, the display device 30, the input device 40, and the storage device 50 are coupled to the baseband device 20.

The baseband device 20 includes a processor 21 for controlling the communications with two subscriber identity cards (denoted as C1 and C2), controlling the RF device 10 for wireless communications with the service network 220, sending a series of frame data (e.g. representing text messages, graphics, images or others) to the display device 30, receiving signals from the input device 40, and storing and retrieving data to and from the storage device 50.

In particular, the processor 21 coordinates the above mentioned operations of the RF device 10, the display device 30, the input device 40, and the storage device 50 for performing the methods proposed in the present application.

For example, the processor 21 may be a general-purpose processor, a Micro Control Unit (MCU), a Digital Signal Processor (DSP), or the like, which includes various circuits for providing the aforementioned functions. As will be appreciated by persons skilled in the art, the circuits of the processor 21 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

Although not shown, the baseband device 20 may further contain other hardware components to perform baseband signal processing, including Analog-to-Digital Conversion (ADC)/Digital-to-Analog Conversion (DAC), gain adjusting, modulation/demodulation, encoding/decoding, and so on.

The RF device 10 may receive RF wireless signals via the antenna, convert the received RF wireless signals to baseband signals, which are processed by the baseband device 20, or receive baseband signals from the baseband device 20 and convert the received baseband signals to RF wireless signals, which are later transmitted via the antenna. The RF device 10 may also contain multiple hardware devices to perform radio frequency conversion. For example, the RF device 10 may include a mixer to multiply the baseband signals with a carrier oscillated in the radio frequency of the supported RAT, wherein the radio frequency may be 900 MHz, 1800 MHz or 1900 MHz utilized in the GSM/GPRS/EDGE technology, or may be 900 MHz, 1900 MHz or 2100 MHz utilized in the UMTS technology, or others, depending on the RAT in use.

In one embodiment, the subscriber identity cards may be single-mode subscriber identity cards which are plugged into two sockets (not shown) of the mobile communication device 210 for providing two separate subscriber numbers. Each of the subscriber identity cards may be a SIM, USIM, R-UIM or CSIM card, which is provided by a particular network operator.

In another embodiment, one dual-mode subscriber identity card, instead of two single-mode subscriber identity cards, may be plugged into a socket (not shown) of the mobile communication device 210 for providing two separate subscriber numbers.

Alternatively, a single-mode subscriber identity card and a dual-mode subscriber identity card, or two dual-mode subscriber identity cards may be plugged into two sockets (not shown) of the mobile communication device 210 for providing more than two subscriber numbers, or one or both of the subscriber numbers may be directly written into the mobile communication device 210, without the need for any socket to insert any subscriber identity card, or the subscriber numbers may be provided by a virtual subscriber identity card, and the present application should not be limited thereto.

In one embodiment, the baseband device 20 may include a dual-card controller (not shown) for powering the subscriber identity cards with the same or different voltage levels according to the requirements thereof by a Power Management Integrated Chip (PMIC) and a battery, wherein the voltage level for each subscriber identity card is determined during initiation. The baseband device 20 may read data from one of the subscriber identity cards, and writes data to one of the subscriber identity cards via the dual-card controller. In addition, the dual-card controller selectively transfers clocks, resets, and/or data signals to the subscriber identity cards according to instructions issued by the baseband device 20.

In another embodiment, the baseband device 20 may include two interfaces (not shown) which independently handle the communications with the subscriber identity cards.

The display device 30 may be a Liquid-Crystal Display (LCD), Light-Emitting Diode (LED) display, an Organic LED (OLED) display, or Electronic Paper Display (EPD), etc., for providing a display function. Alternatively, the display device 30 may further include one or more touch sensors disposed thereon or thereunder for sensing touches, contacts, or approximations of objects, such as fingers or styluses.

The input device 40 may include one or more buttons, a keyboard, a mouse, a touch pad, a video camera, a microphone, and/or a speaker, etc., serving as the Man-Machine Interface (MMI) for interaction with users.

The storage device 50 may be a non-transitory machine-readable storage medium, including a memory, such as a FLASH memory or a Non-volatile Random Access Memory (NVRAM), a magnetic storage device, such as a hard disk or a magnetic tape, an optical disc, or any combination thereof for storing data, instructions, and/or program code of applications, communication protocols, and/or the methods proposed in the present application.

In another embodiment, the program code of communication protocols and the methods proposed in the present application may be stored in another storage device (e.g., a memory) in the baseband device 20.

It should be understood that the components described in the embodiment of FIG. 3 are for illustrative purposes only and are not intended to limit the scope of the application. For example, the mobile communication device 210 may include more components, such as a power supply, and/or a Global Positioning System (GPS) device, wherein the power supply may be a mobile/replaceable battery providing power to all the other components of the mobile communication device 210, and the GPS device may provide the location information of the mobile communication device 210 for use with some location-based services or applications.

Figure 4:
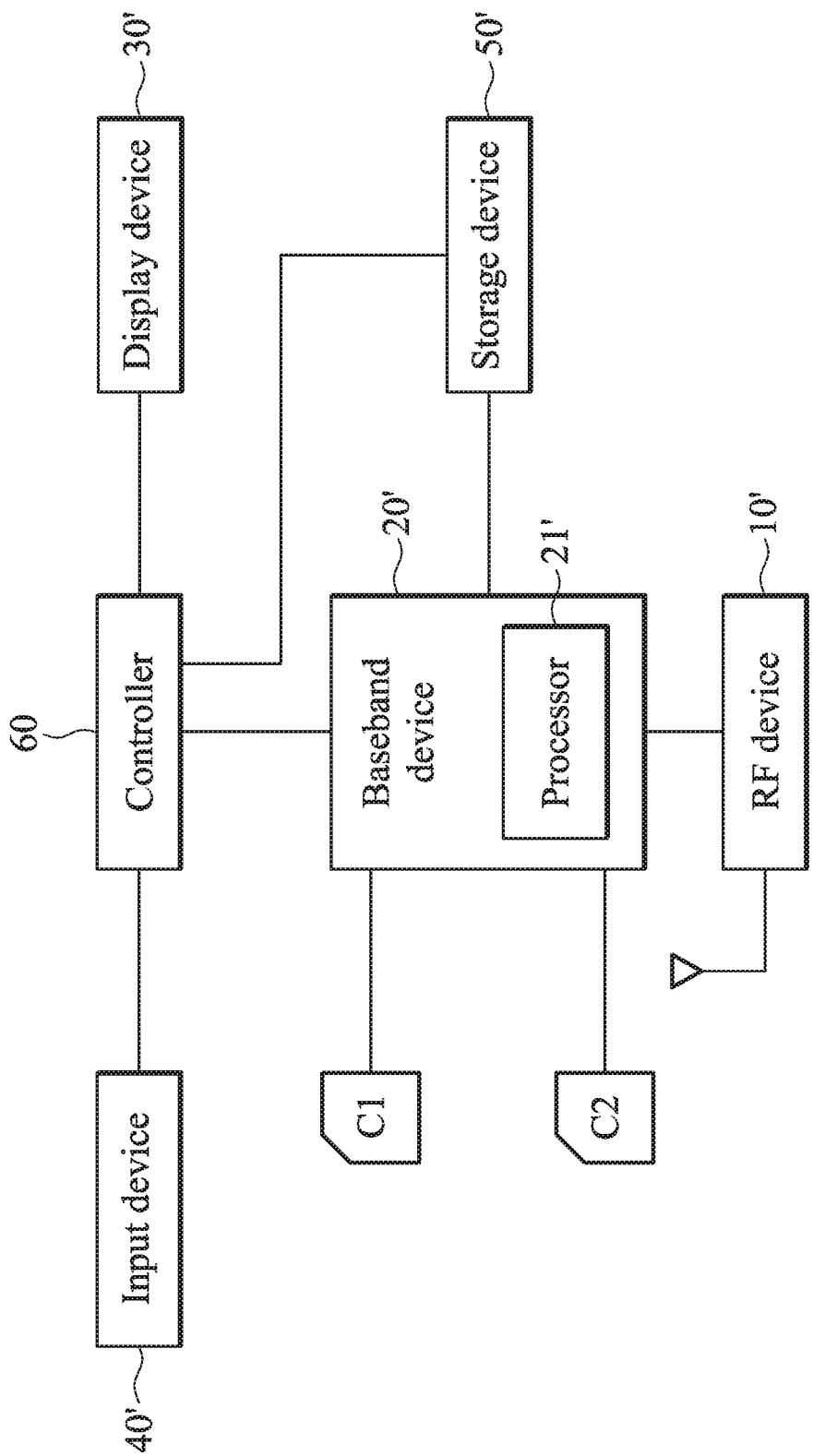
FIG. 4 is a block diagram illustrating the mobile communication device 210 according to another embodiment of the application.

FIG. 4 is a block diagram illustrating the mobile communication device 210 according to another embodiment of the application.

As shown in FIG. 4, the mobile communication device 210 includes an RF device 10', a baseband device 20', a display device 30', an input device 40', a storage device 50', and a controller 60, wherein the baseband device 20', the display device 30', the input device 40', and the storage device 50' are coupled to the controller 60, and the RF device 10' is coupled to the baseband device 20'.

The controller 60 may be a general-purpose processor, an MCU, an Application Processor (AP), a Digital Signal Processor (DSP), or others, for controlling the baseband device 20' for wireless communications with the service network 220, sending a series of frame data (e.g. representing text messages, graphics, images or others) to the display device 30', receiving signals from the input device 40', and storing and retrieving data to and from the storage device 50'.

Unlike the embodiment of FIG. 3, the baseband device 20' is not responsible for controlling the operations of the display device 30', the input device 40', and the storage device 50'. Other detailed description of the RF device 10', the baseband device 20', the display device 30', the input device 40', and the storage device 50' is similar to the embodiment of FIG. 3, and thus, is omitted herein for brevity.

Figure 5:
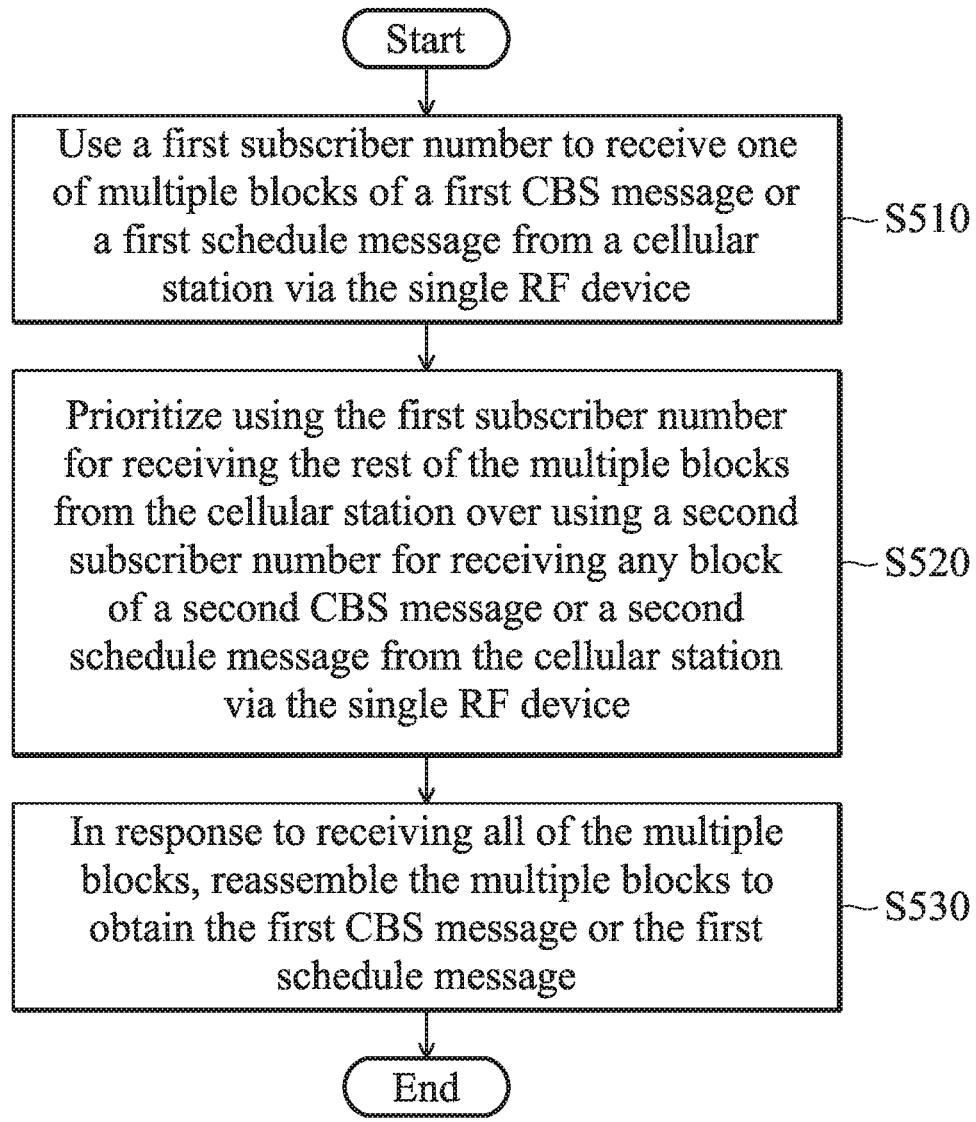
FIG. 5 is a flow chart illustrating the method for coordinating operations of receiving cell broadcast messages using different subscriber numbers according to an embodiment of the application.

FIG. 5 is a flow chart illustrating the method for coordinating operations of receiving cell broadcast messages using different subscriber numbers according to an embodiment of the application.

In this embodiment, the method for coordinating operations of receiving cell broadcast messages using different subscriber numbers may be applied to a multiple-card and single-RF cellular phone (e.g., the mobile communication device 210), wherein the multiple cards are camped on the same cell.

Specifically, the method for coordinating operations of receiving cell broadcast messages using different subscriber numbers may be implemented in program code which is loaded and executed by a baseband processor (e.g., the processor 21 or 21').

To begin with, the mobile communication device uses a first subscriber number to receive one of multiple blocks of a first CBS message or a first schedule message from a cellular station via the single RF device (step S510). That is, the first CBS message or the first schedule message is configured to be transmitted in a plurality of blocks from the first cellular station to the mobile communication device, and now, one of the blocks has been received by the mobile communication device.

In one embodiment, the mobile communication device may determine whether the received one block is the first block of the first CBS message or the first schedule message, and if so, the method proceeds to step S520.

Next, the mobile communication device prioritizes using the first subscriber number for receiving the rest of the multiple blocks from the cellular station over using a second subscriber number for receiving any block of a second CBS message or a second schedule message from the cellular station via the single RF device (step S520). That is, the reception operation associated with the first subscriber number is prioritized over the reception operation associated with the second subscriber number. Specifically, the reception operation includes Common Traffic Channel (CTCH) decoding if the cellular station belongs to a UMTS network, or includes Cell Broadcast Channel (CBCH) decoding when the cellular station belongs to a GSM network.

In one embodiment, the mobile communication device may initially configure both the reception operations associated with the first and second subscriber numbers to have the same priority level (e.g., level X), and then increase the priority level of the reception operation associated with the first subscriber number by one (e.g., level X+1) in step S520.

After that, in response to receiving all of the multiple blocks, the mobile communication device reassembles the multiple blocks to obtain the first CBS message or the first schedule message (step S530), and the method ends.

In one embodiment, the mobile communication device may reset the priority level of the reception operation associated with the first subscriber number to the initial value (e.g., level X) after step S530.

To clarify further, the first or second schedule message may be received when the communications with the cellular station is configured to be in the Discontinuous Reception (DRX) level 1 scheduling mode, while the first or second CBS message may be received when the communications with the cellular station is configured to be in the DRX level 1 scheduling mode or the DRX level 2 scheduling mode.

Figure 6:
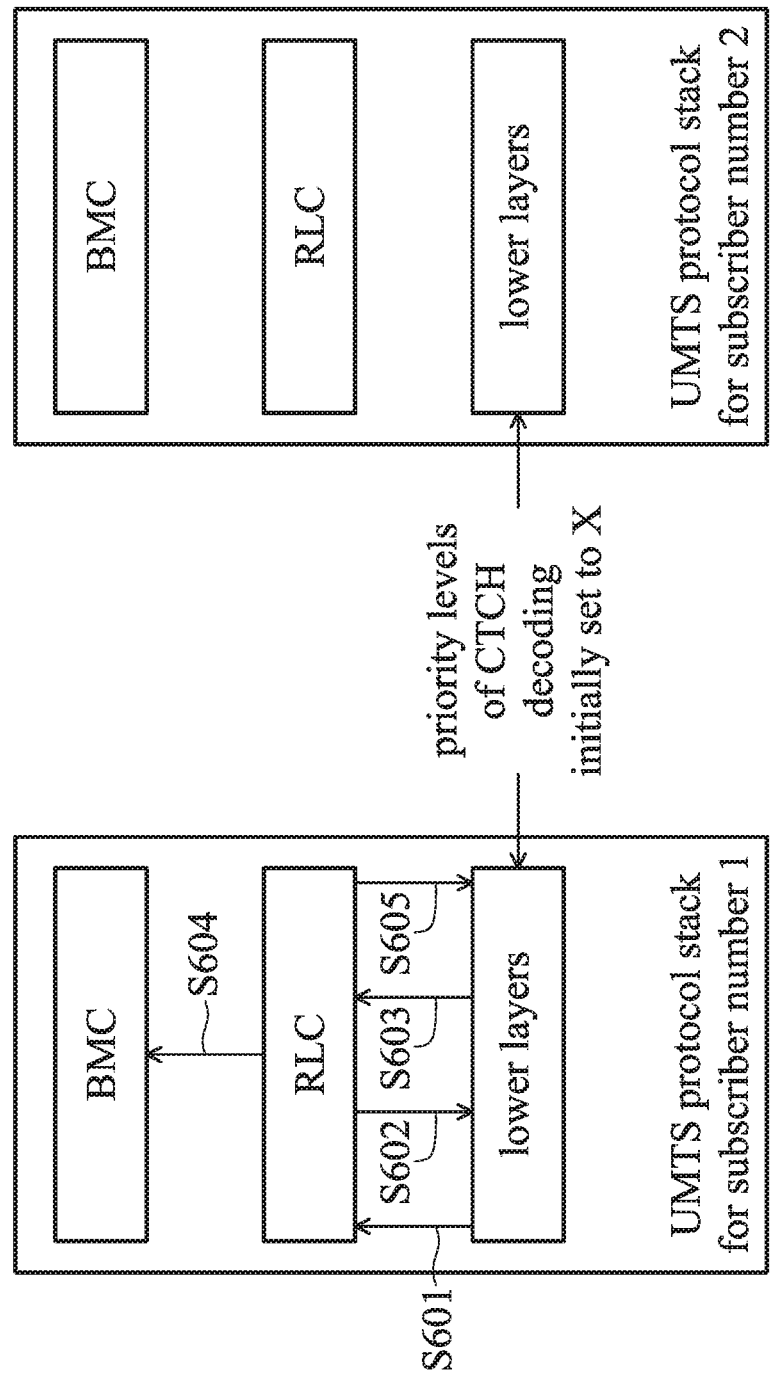
FIG. 6 is a schematic diagram illustrating the coordinated operations of receiving cell broadcast messages using different subscriber numbers according to an embodiment of the application.

FIG. 6 is a schematic diagram illustrating the coordinated operations of receiving cell broadcast messages using different subscriber numbers according to an embodiment of the application.

In this embodiment, the method for coordinating operations of receiving cell broadcast messages using different subscriber numbers is implemented in the RLC layer of the UMTS protocol, and two separate UMTS protocol stacks are maintained for the wireless communications associated with two subscriber numbers.

As shown in FIG. 6, in the lower layers (e.g., the Media Access Control (MAC) layer and the Physical (PHY) layer) of the protocol stacks for the two subscriber numbers, the priority levels of CTCH decoding associated with two subscriber numbers are both initially configured to a value of X.

In step S601, the RLC layer of the UMTS protocol stack for the first subscriber number receives a CTCH block (e.g., the first CTCH block) of a CBS message or a schedule message from the lower layers.

In step S602, the RLC layer of the UMTS protocol stack for the first subscriber number increases the priority level of CTCH decoding in the lower layer by one (i.e., set to X+1).

In step S603, the RLC layer of the UMTS protocol stack for the first subscriber number receives the rest of the CTCH blocks of the CBS message or the schedule message from the lower layers.

In step S604, the RLC layer of the UMTS protocol stack for the first subscriber number reassembles all received CTCH blocks to obtain a complete CBS message or schedule message, and sends the complete CBS message or schedule message to the Broadcast and Multicast Control (BMC) layer.

In step S605, the RLC layer of the UMTS protocol stack for the first subscriber number resets (i.e., decreases) the priority level of CTCH decoding in the lower layer to the initial value of X.

It should be understood that the protocol layers described in the embodiment of FIG. 6 are for illustrative purposes only and are not intended to limit the scope of the application. For example, each UMTS protocol stack may include more layers, such as a Packet Data Convergence Protocol (PDCP) layer, a Radio Resource Control (RRC) layer, and a Non-Access Stratum (NAS) layer.

Figure 7:
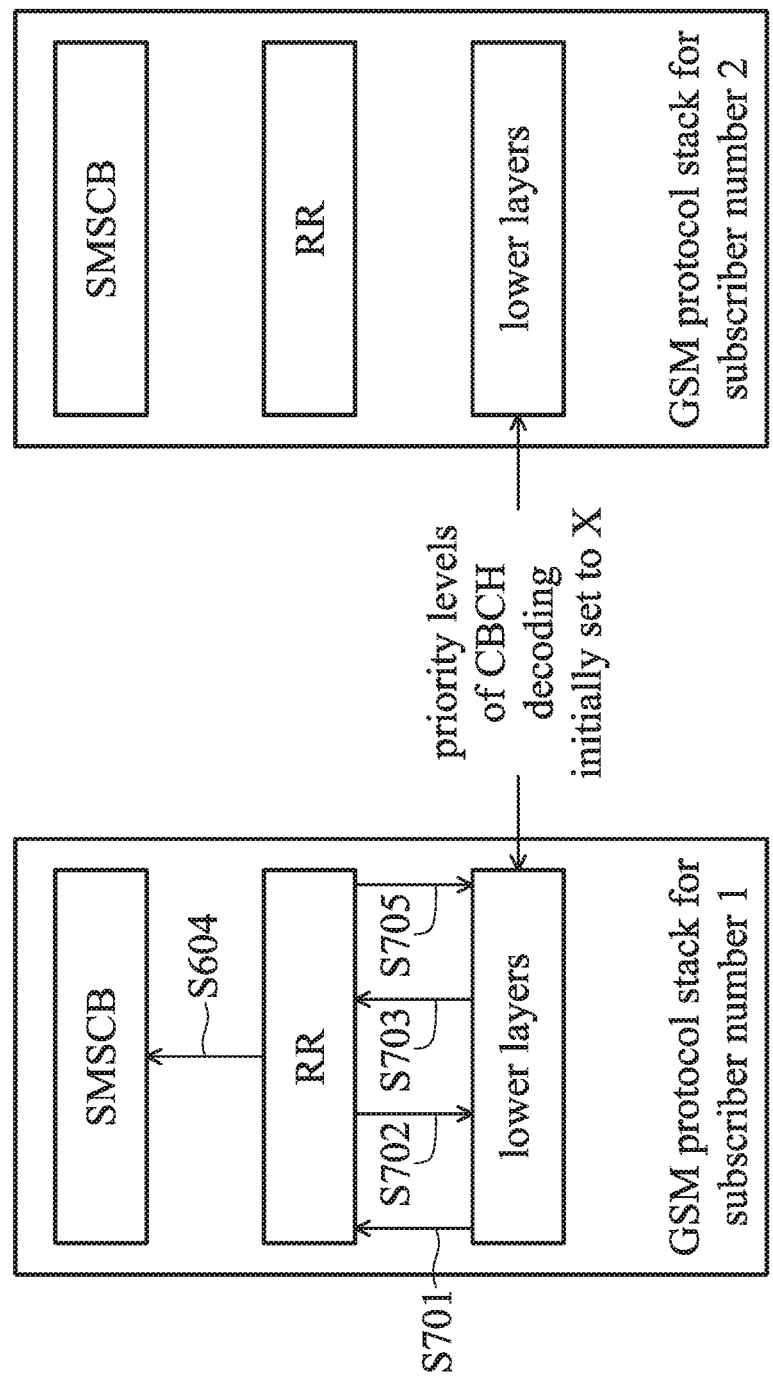
FIG. 7 is a schematic diagram illustrating the coordinated operations of receiving CBS messages using multiple subscriber numbers according to another embodiment of the application.

FIG. 7 is a schematic diagram illustrating the coordinated operations of receiving CBS messages using multiple subscriber numbers according to another embodiment of the application.

In this embodiment, the method for coordinating operations of receiving cell broadcast messages using different subscriber numbers is implemented in the RR layer of the GSM protocol, and two separate GSM protocol stacks are maintained for the wireless communications associated with two subscriber numbers.

As shown in FIG. 7, in the lower layers (e.g., the Link Access Protocol for the D channel (LAP-D) layer and the PHY layer) of the protocol stacks for the two subscriber numbers, the priority levels of CBCH decoding associated with two subscriber numbers are both initially configured to a value of X.

In step S701, the RR layer of the GSM protocol stack for the first subscriber number receives a CBCH block (e.g., the first CBCH block) of a CBS message or a schedule message from the lower layers.

In step S702, the RR layer of the GSM protocol stack for the first subscriber number increases the priority level of CBCH decoding in the lower layer by one (i.e., set to X+1).

In step S703, the RR layer of the GSM protocol stack for the first subscriber number receives the rest of the CBCH blocks of the CBS message or the schedule message from the lower layers.

In step S704, the RR layer of the GSM protocol stack for the first subscriber number reassembles all received CBCH blocks and sends the complete CBS message or schedule message to the Short Message Service Cell Broadcast (SMSCB) layer.

In step S705, the RR layer of the GSM protocol stack for the first subscriber number resets (i.e., decreases) the priority level of CBCH decoding in the lower layer to the initial value of X.

It should be understood that the protocol layers described in the embodiment of FIG. 7 are for illustrative purposes only and are not intended to limit the scope of the application. For example, each GSM protocol stack may include more layers, such as a Mobility management (MM) layer, and a Connection management (CM) layer.

In view of the forgoing embodiments of FIGS. 5 to 7, it will be appreciated that the present application allows at least one subscriber number to receive a complete CBS message or a complete schedule message, by prioritizing one subscriber number at a time for receiving all the blocks of a CBS message or a schedule message for one subscriber number. Advantageously, the problem of the CBS messages or schedule messages being missed by multiple subscriber numbers may be avoided.

Figure 8:
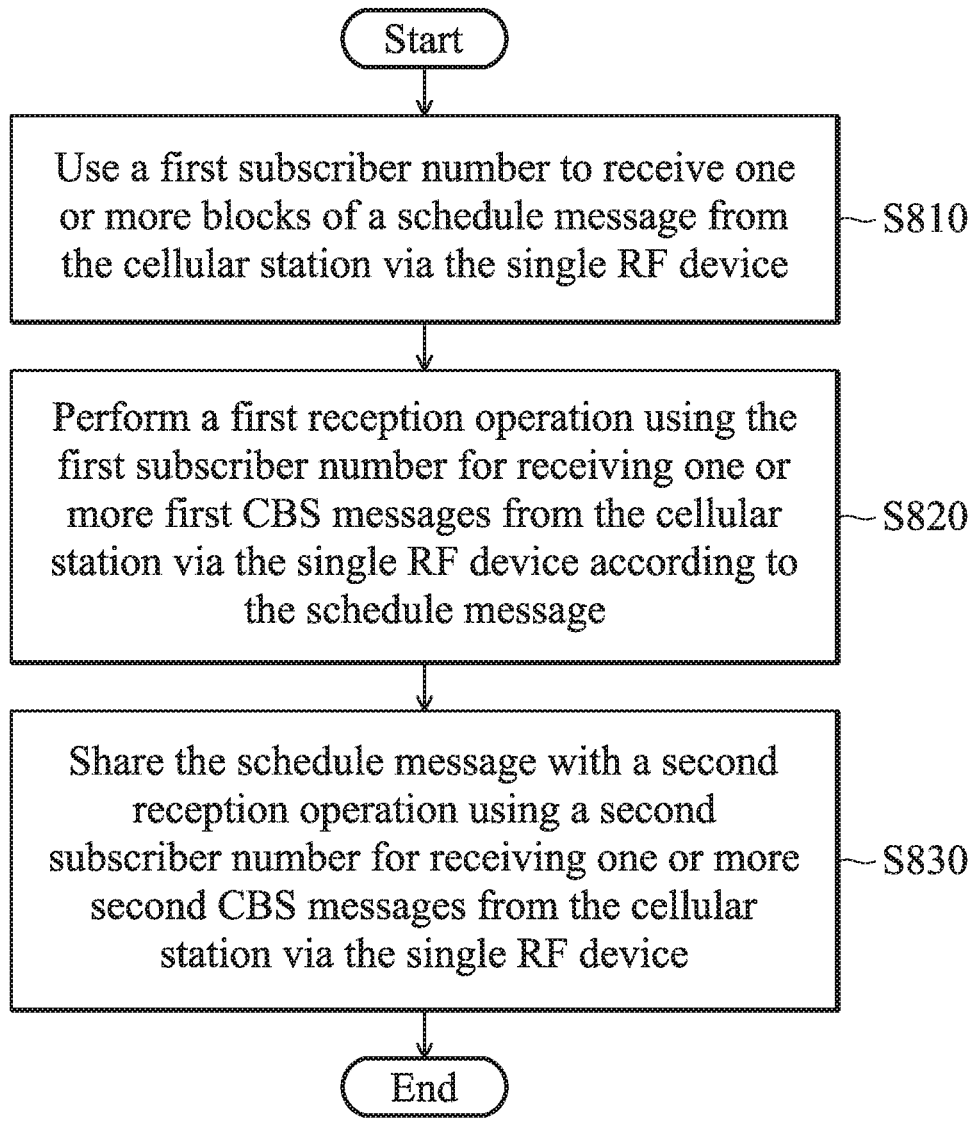
FIG. 8 is a flow chart illustrating the method for sharing schedule information between operations of receiving CBS messages using different subscriber numbers according to an embodiment of the application.

FIG. 8 is a flow chart illustrating the method for sharing schedule information between operations of receiving CBS messages using different subscriber numbers according to an embodiment of the application.

In this embodiment, the method for sharing schedule information between operations of receiving CBS messages using different subscriber numbers may be applied to a multiple-card and single-RF cellular phone (e.g., the mobile communication device 210), wherein the multiple cards are camped on the same cell.

Specifically, the method for sharing schedule information between operations of receiving CBS messages using different subscriber numbers may be implemented in program code which is loaded and executed by a baseband processor (e.g., the processor 21 or 21').

To begin with, the mobile communication device uses a first subscriber number to receive one or more blocks of a schedule message from the cellular station via the single RF device (step S810).

Next, the mobile communication device performs a first reception operation using the first subscriber number for receiving one or more first CBS messages from the cellular station via the single RF device according to the schedule message (step S820).

Specifically, the schedule message includes the information of all CBS message IDs to be transmitted in this schedule period and the information of when the next schedule message will be transmitted, while the multiple cards have different message ID subscription.

After that, the mobile communication device shares the one or more blocks of the first schedule message with a second reception operation using a second subscriber number for receiving one or more second CBS messages from the cellular station via the single RF device (step S830), and the method ends.

In one embodiment, the schedule message may consist of only one block, and step S830 may be performed prior to step S820.

In another embodiment, the schedule message may consist of multiple blocks. The method as described in FIG. 5 may be applied to receive all blocks of the schedule message using the first subscriber number. Alternatively, the rest of the blocks of the schedule message may be received using the second subscriber number, and the complete schedule message may be reassembled through sharing the block(s) of the schedule message between the subscriber numbers.

To clarify further, after completing the method for sharing schedule information between operations of receiving CBS messages using different subscriber numbers, the method described in FIG. 5 may be applied to receive the CBS message(s) for the two subscriber numbers.

Figure 9:
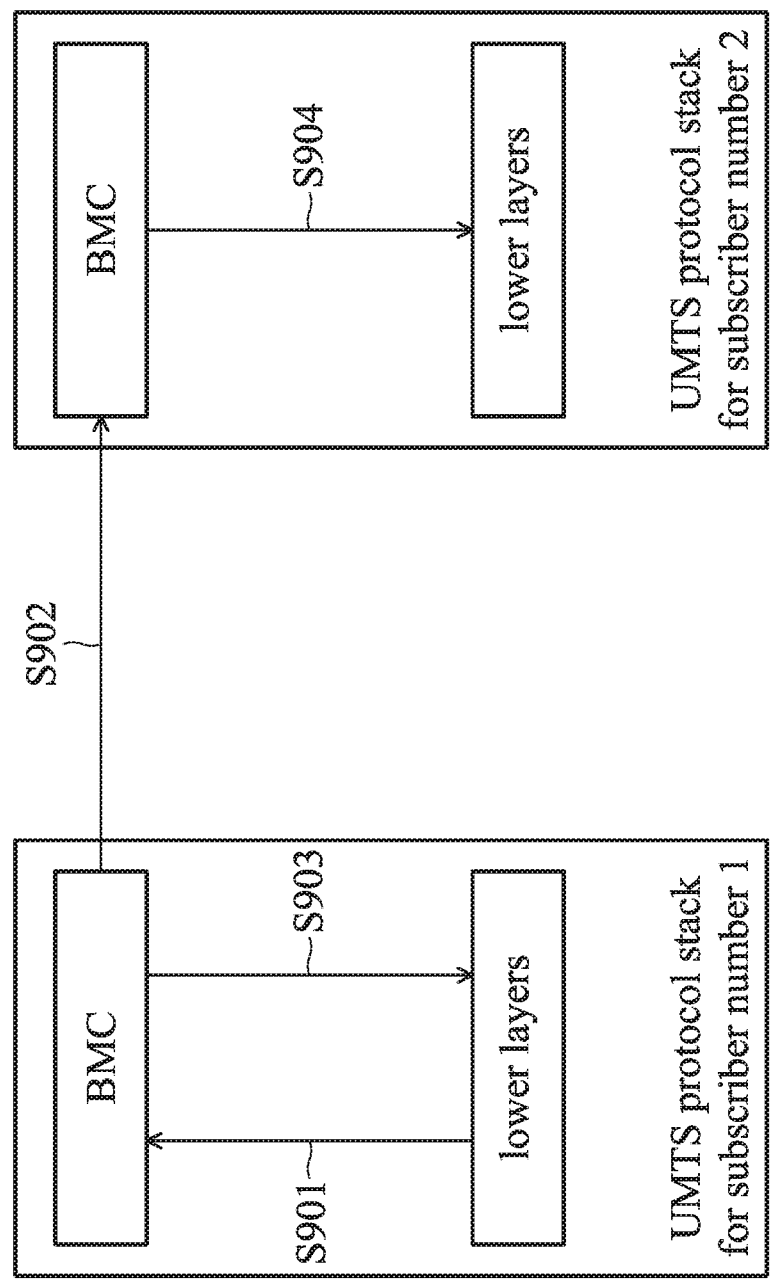
FIG. 9 is a schematic diagram of sharing schedule information between operations of receiving CBS messages using different subscriber numbers according to an embodiment of the application.

FIG. 9 is a schematic diagram illustrating sharing schedule information between operations of receiving CBS messages using different subscriber numbers according to an embodiment of the application.

In this embodiment, the method for sharing schedule information between operations of receiving CBS messages using different subscriber numbers is implemented in the BMC layer of the UMTS protocol, and two separate UMTS protocol stacks are maintained for the wireless communications associated with two subscriber numbers.

In step S901, the lower layers (e.g., the RLC layer, the MAC layer, and the PHY layer) of the UMTS protocol stack for the first subscriber number send the received schedule message to the BMC layer.

In step S902, the BMC layer of the UMTS protocol stack for the first subscriber number shares the schedule message with the BMC layer of the protocol stack for the second subscriber number.

In step S903, the BMC layer of the UMTS protocol stack for the first subscriber number indicates the lower layers to configure the communications with the first cellular station to switch from the DRX level 1 scheduling mode to the DRX level 2 scheduling mode for receiving CBS message(s) according to the schedule message.

In step S904, the BMC layer of the UMTS protocol stack for the second subscriber number indicates the lower layers to configure the communications with the second cellular station to switch from the DRX level 1 scheduling mode to the DRX level 2 scheduling mode for receiving CBS message(s) according to the schedule message.

Figure 10:
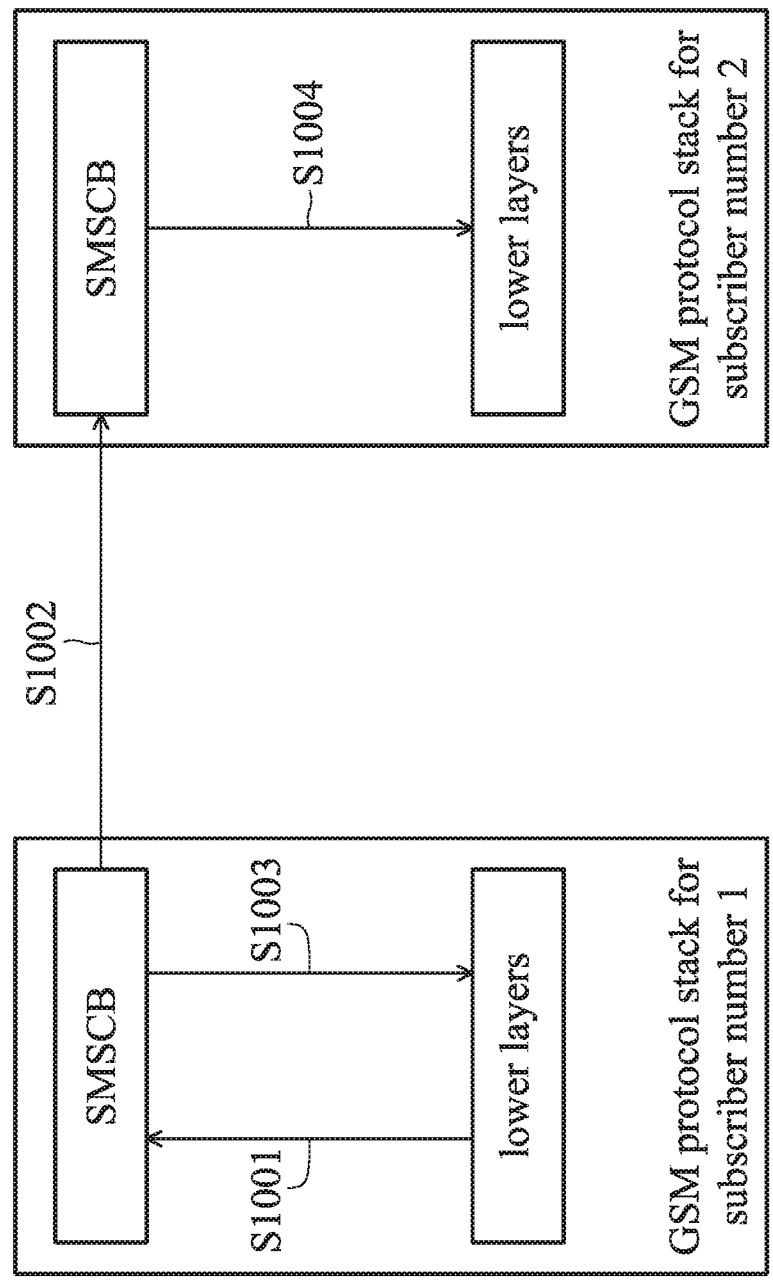
FIG. 10 is a schematic diagram of sharing schedule information between operations of receiving CBS messages using different subscriber numbers according to another embodiment of the application.

FIG. 10 is a schematic diagram illustrating sharing schedule information between operations of receiving CBS messages using different subscriber numbers according to another embodiment of the application.

In this embodiment, the method for sharing schedule information between operations of receiving CBS messages using different subscriber numbers is implemented in the SMSCB layer of the GSM protocol, and two separate GSM protocol stacks are maintained for the wireless communications associated with two subscriber numbers.

In step S1001, the lower layers (e.g., the RR layer, the LAP-D layer, and the PHY layer) of the GSM protocol stack for the first subscriber number send the received schedule message to the SMSCB layer.

In step S1002, the SMSCB layer of the GSM protocol stack for the first subscriber number shares the schedule message with the SMSCB layer of the protocol stack for the second subscriber number.

In step S1003, the SMSCB layer of the GSM protocol stack for the first subscriber number indicates the lower layers to configure the communications with the first cellular station to switch from the DRX level 1 scheduling mode to the DRX level 2 scheduling mode for receiving CBS message(s) according to the schedule message.

In step S1004, the SMSCB layer of the GSM protocol stack for the second subscriber number indicates the lower layers to configure the communications with the second cellular station to switch from the DRX level 1 scheduling mode to the DRX level 2 scheduling mode for receiving CBS message(s) according to the schedule message.

In view of the forgoing embodiments of FIGS. 8 to 10, it will be appreciated that the present application allows the communications associated with both subscriber numbers to enter the DRX level 2 scheduling mode to receive the CBS message(s) for both subscriber numbers, by sharing the received schedule message for one subscriber number with the reception operation associated with the other subscriber number. Advantageously, the problem of the CBS message(s) being missed by both subscriber numbers may be avoided.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A mobile communication device, comprising:
   a single Radio Frequency (RF) device, configured to perform wireless transmission and reception to and from a cellular station; and
   a baseband processor, configured to use a first subscriber number to receive one of multiple blocks of a first Cell Broadcast Service (CBS) message or a first schedule message from the cellular station via the single RF device, prioritize using the first subscriber number for receiving the rest of the multiple blocks from the cellular station over using a second subscriber number for receiving any block of a second CBS message or a second schedule message from the cellular station via the single RF device, and in response to receiving all of the multiple blocks, reassemble the multiple blocks to obtain the first CBS message or the first schedule message;
   wherein, in response to receiving all of the multiple blocks of the first schedule message, the baseband processor is further configured to share the first schedule message with a reception operation using the second subscriber number for receiving the second CBS message or the second schedule message.

2. The mobile communication device of claim 1, wherein the baseband processor is further configured to determine whether the one received block is the first block of the first CBS message or the first schedule message, and in response to the one received block being the first block of the first CBS message or the first schedule message, prioritize using the first subscriber number for receiving the rest of the multiple blocks from the cellular station over using the second subscriber number for receiving any block of the second CBS message or the second schedule message from the cellular station via the single RF device.

3. The mobile communication device of claim 1, wherein the multiple blocks of the first schedule message are received in a Discontinuous Reception (DRX) level 1 scheduling mode of communications with first cellular station, and the baseband processor is further configured to configure the communications with the cellular station to enter a DRX level 2 scheduling mode for receiving the first CBS message according to the first schedule message, and configure communications with the cellular station to switch from the DRX level 1 scheduling mode to the DRX level 2 scheduling mode for receiving the second CBS message according to the first schedule message.

4. The mobile communication device of claim 1, wherein each of the multiple blocks is a Common Traffic Channel (CTCH) block when the cellular station belongs to a Universal Mobile Telecommunications System (UMTS) network, or is a Cell Broadcast Channel (CBCH) block when the cellular station belongs to a Global System for Mobile communications (GSM) network.

5. A method for coordinating operations of receiving cell broadcast messages using different subscriber numbers in a mobile communication device comprising a single Radio Frequency (RF) device, comprising:
using a first subscriber number to receive one of multiple blocks of a first Cell Broadcast Service (CBS) message or a first schedule message from a cellular station via the single RF device;
prioritizing using the first subscriber number for receiving the rest of the multiple blocks from the cellular station over using a second subscriber number for receiving any block of a second CBS message or a second schedule message from the cellular station via the single RF device;
in response to receiving all of the multiple blocks, reassembling the multiple blocks to obtain the first CBS message or the first schedule message; and
in response to receiving all of the multiple blocks of the first schedule message, sharing the first schedule message with a reception operation using the second subscriber number for receiving the second CBS message or the second schedule message.

6. The method of claim 5, further comprising:
determining whether the one received block is the first block of the first CBS message or the first schedule message; and
in response to the one received block being the first block of the first CBS message or the first schedule message, prioritizing using the first subscriber number for receiving the rest of the multiple blocks from the cellular station over using the second subscriber number for receiving any block of the second CBS message or the second schedule message from the cellular station via the single RF device.

7. The method of claim 5, wherein the multiple blocks of the first schedule message are received in a Discontinuous Reception (DRX) level 1 scheduling mode of communications with the cellular station, and the method further comprises:
configuring the communications with the cellular station to enter a DRX level 2 scheduling mode for receiving the first CBS message according to the first schedule message; and
configuring communications with the cellular station to switch from the DRX level 1 scheduling mode to the DRX level 2 scheduling mode for receiving the second CBS message according to the first schedule message.

8. The method of claim 5, wherein each of the multiple blocks is a Common Traffic Channel (CTCH) block when the cellular station belongs to a Universal Mobile Telecommunications System (UMTS) network, or is a Cell Broadcast Channel (CBCH) block when the cellular station belongs to a Global System for Mobile communications (GSM) network.

9. A mobile communication device, comprising:
a single Radio Frequency (RF) device, configured to perform wireless transmission and reception to and from a cellular station; and
a baseband processor, configured to use a first subscriber number to receive one or more blocks of a schedule message from the cellular station via the single RF device, perform a first reception operation using the first subscriber number for receiving one or more first Cell Broadcast Service (CBS) messages from the cellular station via the single RF device according to the schedule message, and share the one or more blocks of the schedule message with a second reception operation using a second subscriber number for receiving one or more second CBS messages from the cellular station via the single RF device.

10. The mobile communication device of claim 9, wherein, when the one or more blocks comprise only a part of the schedule message, the baseband processor is further configured to use the second subscriber number to receive the rest blocks of the schedule message from the cellular station via the single RF device, and reassemble the schedule message from the blocks received using the first subscriber number and the second subscriber number.

11. The mobile communication device of claim 9, wherein the at least one block of the schedule message is received in a Discontinuous Reception (DRX) level 1 scheduling mode of communications with the first cellular station, and the baseband processor is further configured to configure the communications with the cellular station to enter a DRX level 2 scheduling mode for performing the first reception operation and the second reception operation.

12. The mobile communication device of claim 9, wherein the cellular station belongs to a Global System for Mobile communications (GSM) network or a Universal Mobile Telecommunications System (UMTS)network.

13. A method for sharing schedule information between operations of receiving Cell Broadcast Service (CBS) messages using different subscriber numbers in a mobile communication device comprising a single Radio Frequency (RF) device, comprising:
using a first subscriber number to receive one or more blocks of a schedule message from a cellular station via the single RF device;
performing a first reception operation using the first subscriber number for receiving one or more first CBS messages from the cellular station via the single RF device according to the schedule message; and
sharing the one or more blocks of the schedule message with a second reception operation using a second subscriber number for receiving one or more second CBS messages from the cellular station via the single RF device.

14. The method of claim 13, wherein, when the one or more blocks comprise only a part of the schedule message, the method further comprises:

using the second subscriber number to receive the rest blocks of the schedule message from the cellular station via the single RF device; and reassembling the schedule message from the blocks received using the first subscriber number and the second subscriber number.

15. The method of claim 13, wherein the schedule message is received in a Discontinuous Reception (DRX) level 1 scheduling mode of communications with the cellular station, and the method further comprises:

configuring the communications with the cellular station to enter a DRX level 2 scheduling mode for performing the first reception operation and the second reception operation.

16. The method of claim 13, wherein the cellular station belongs to a Global System for Mobile communications (GSM) network or a Universal Mobile Telecommunications System (UMTS) network.

* * * * *